UNITED STATES PATENT OFFICE.

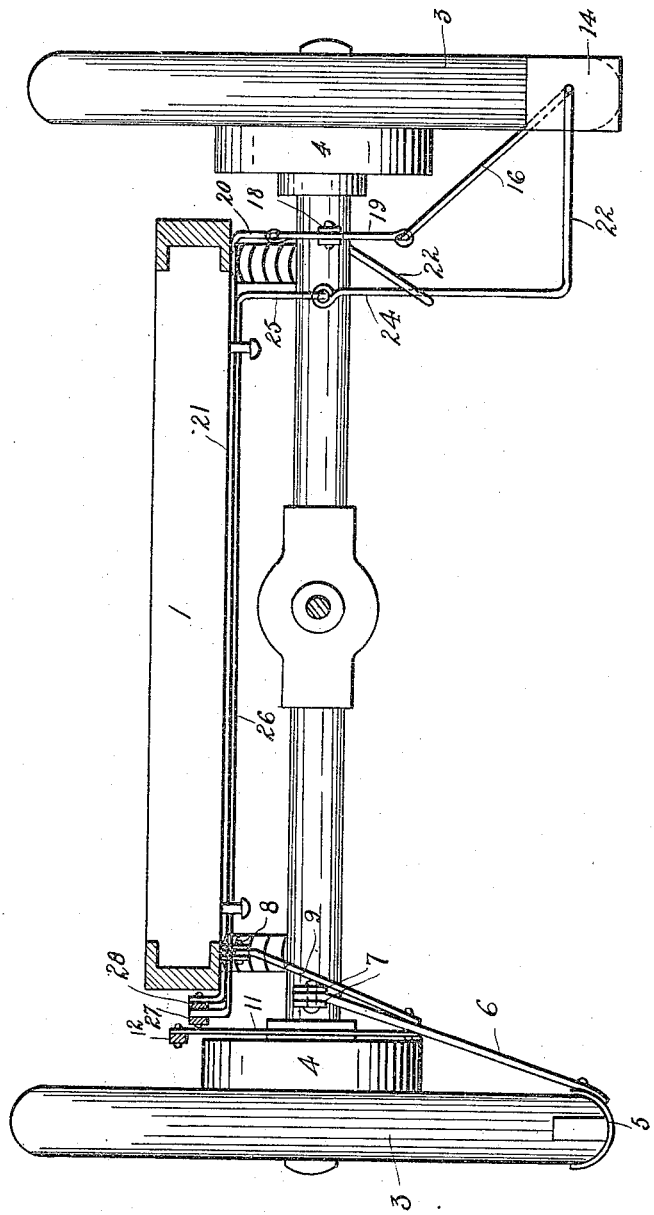

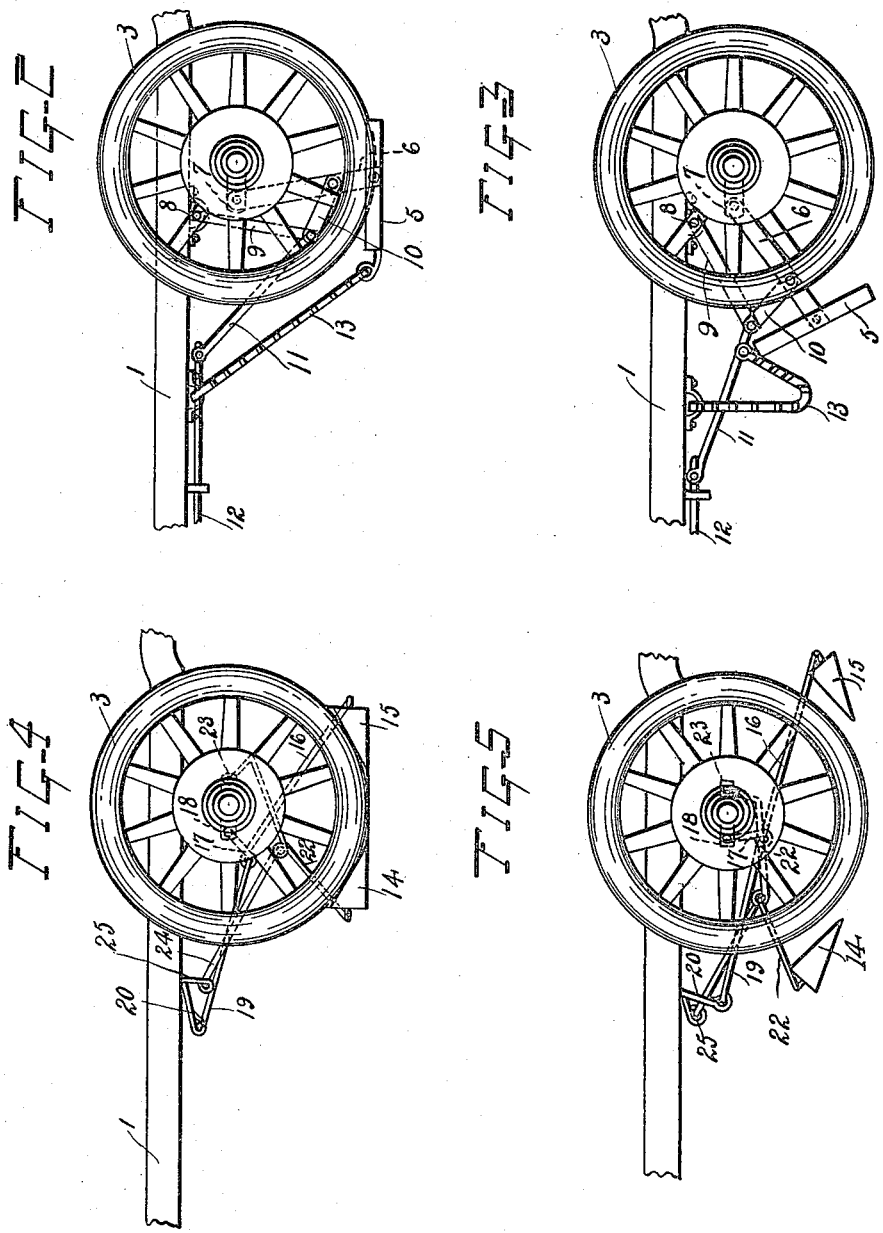

JOSEPH ARMAND MARENGER, OF MONTREAL, QUEBEC, CANADA.

COMBINATION BRAKE AND BLOCK FOR VEHICLES.

1,220,357.  Specification of Letters Patent.  Patented Mar. 27, 1917.

Application filed October 16, 1916. Serial No. 125,786.

*To all whom it may concern:*

Be it known that I, JOSEPH ARMAND MARENGER, a subject of the King of Great Britain, residing at Montreal, Province of Quebec, Canada, have invented certain new and useful Improvements in Combination Brakes and Blocks for Vehicles; and I do hereby declare that the following is a full, clear, and exact description of the invention, such as will enable others skilled in the art to which it appertains to make and use the same.

The present invention relates to a combination brake and blocks for vehicle wheels which may be applied to any vehicle and when in use the brake will seat itself between one tire of the vehicle and the ground over which the vehicle is traveling and the blocks for the vehicle wheel are adapted to be interposed between the tire of another wheel of the vehicle and the ground over which the wheel is traveling, but are not to be put in use unless the vehicle is stopped or traveling very slow so as to prevent the vehicle from moving in either direction and yet permit the wheels of the vehicle to rotate so that no great shock is imparted to the wheel of the vehicle or the running gear, but the momentum of the entire vehicle is halted.

An object of the invention is to provide a simple, durable and efficient device of the character aforesaid which may be readily assembled and installed and the parts thereof may be comparatively inexpensive in the cost of manufacturing, thereby rendering the same commercially desirable.

With the above and other objects in view which will hereinafter appear as the description continues, the invention consists of the novel features of construction, combination and formation of parts as will be hereinafter more fully described and particularly pointed out in the appended claims.

In the accompanying drawings has been shown the simple and preferred form of the invention, it being, however, understood that no limitation is necessarily made to the precise structural details herein exhibited, but the right is hereby reserved to any changes, alterations or modifications to which recourse may be had that come within the scope of the invention without departing from the spirit thereof or sacrificing the efficiency of the same.

In the accompanying drawings:

Figure 1 is a detail transverse section through a vehicle frame showing the invention as applied thereto;

Fig. 2 is a side elevation of the same showing the brake shoe applied thereto and when presented for use;

Fig. 3 is a similar view showing the brake shoe when disengaged;

Fig. 4 is a view similar to Fig. 2 showing the wheel at the opposite side of the vehicle having the blocks in position for use; and, Fig. 5 is a view similar to Fig. 4 showing the blocks when released.

In the accompanying drawings I have shown in detail a portion of an automobile frame, but, of course, it is to be understood that this brake and blocks may be applied to any vehicle now in use. The vehicle as herein shown comprises a body frame 1 having a rear axle for supporting the same and carried by the axle are the rear driving wheels 3 which are adapted to be controlled by means of the ordinary band brakes 4.

Should the brakes 4 fail to work while the vehicle is traveling over the ground it is the purpose of the present invention to provide an auxiliary emergency brake shoe 5 which is adapted to engage the tire of one of the wheels 3 and seat itself between the tire and the ground thereby providing a positive acting brake which may be thrown into use although power may be still supplied to the driving wheels without in any way injuring the wheels or the vehicle frame. Pivotally connected to the brake shoe is a lever 6 and the upper end of this lever 6 is pivotally connected to the lugs 7, the latter of which may be formed integral or secured in any suitable manner to the casing inclosing the rear driving axles. Pivotally connected to the bracket 8 carried by the frame of the vehicle is a link 9 and pivotally connected to the lower end of this link 9 is a smaller link 10. Connected to the pivoted connection between the links 9 and 10 is a rod 11 and this rod 11 is connected to a rod 12 which latter rod is to be operated by means of a hand lever adjacent to the driver's seat. Connected to the forward end of the shoe 5 is a chain or any suitable flexible member 13 and the opposite end of this chain 13 is connected to the vehicle frame. This chain 13 is for limiting the swinging movement of the brake shoe 5 whereby when the brake shoe is to be released or permitted to be lowered the chain 13 will hold the brake shoe between the tire and the ground as better illustrated in Fig.

2. It is also to be noted that the arm 6 is eccentrically mounted with respect to the wheel so that the brake shoe will fit snugly against the tire of the vehicle wheel when thrown in use, but when the brake shoe is held out of use it will not contact with the tire of the vehicle wheel.

Adapted to engage the tire of the opposite driving wheel are a pair of blocks 14 and 15 respectively. The block 15 is connected to an arm 16 and the upper end of this arm 16 is bent at right angles as at 17 and this latter angular portion is pivotally connected to the lugs 18 carried by the casing inclosing the driving axle. This arm 16 is connected by means of the link 19 to the crank arm 20 of a shaft 21 extending transversely of the frame of the vehicle and journaled thereupon. The block 14 is also connected to an arm 22 which arm is pivotally connected to the lugs 23 carried by the casing for the rear axle but the lugs 18 and 23 are arranged diametrically opposite. This arm 22 is connected by means of a link 24 to the crank arm 25 of a shaft 26 which latter is also journaled and extends transversely of the vehicle frame. The shafts 21 and 26 are each to be controlled by means of hand levers arranged adjacent the driver's seat and these hand levers are connected to the shafts 21 and 26 by means of the rods 27 and 28.

From the foregoing it is obvious that when the vehicle is standing still the blocks 14 and 15 may be placed as shown in Fig. 4 between the vehicle tire and the ground thereby blocking the wheel and preventing the vehicle from moving in either direction, but at the same time should power be applied to the driving wheels they will be permitted to rotate without injuring the same in any manner. By also operatively connecting the blocks 14 and 15 to separate levers adjacent the driver's seat either one of the blocks may be thrown into operation or both blocks may be thrown into operation when desired.

Having thus fully described my invention, what I claim as new and desire to secure by Letters Patent is:

1. The combination with a casing, a driven axle arranged therein and a wheel carried by the driven axle, of lugs extending from said casing, an arm having one end pivotally connected to said lugs, the pivoted end of said arm extending rearwardly and the opposite end of said arm extending forwardly beneath said casing, a block carried by the free end of said arm adapted to rest between the tire of the wheel and the ground to prevent the wheel from rotation, an eyelet formed within the medial portion of said arm, a link connected to said eyelet and a crank shaft connected to said link whereby said arm may be swung upon its pivoted connection so as to cause said block to swing in a path eccentric with the periphery of said wheel substantially as and for the purpose specified.

2. The combination with a casing, a driven axle arranged therein and a driving wheel carried by said axle, of a pair of lugs arranged diametrically opposite upon said casing, a pair of arms each having one end pivotally connected to said lugs, the pivoted ends of each of said arms extending in opposite directions from said casing, the free end of said arm extending in a reverse direction beneath said casing, a block carried by the extreme outer end of each arm, said blocks adapted to rest between the tire of the wheel and the ground to prevent the wheel from rotating in either direction, a link connected to the medial portion of each arm, a crank shaft connected to each link whereby said arms may be swung upon their pivoted connections so as to bring either block into operation and cause said blocks to travel eccentrically with the periphery of said wheels substantially as and for the purpose specified.

In witness whereof I have hereunto set my hand.

JOSEPH ARMAND MARENGER.

Copies of this patent may be obtained for five cents each, by addressing the "Commissioner of Patents, Washington, D. C."